(12) United States Patent
Bordonaro et al.

(10) Patent No.: US 7,467,640 B2
(45) Date of Patent: *Dec. 23, 2008

(54) VALVE FOR AN EXPANDABLE GAS OR LIQUID DISTRIBUTION SYSTEM

(75) Inventors: Robert Bordonaro, Torrington, CT (US); Christopher Bezzina, Tolland, CT (US); Mark Pevoteaux, Parker, CO (US); Todd M. Ables, Centennial, CO (US); Stephen Fiondella, North Haven, CT (US); Jeff Sherrel, Elburn, IL (US)

(73) Assignee: Norgren, Inc., Littleton, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/690,633

(22) Filed: Mar. 23, 2007

(65) Prior Publication Data

US 2007/0284554 A1    Dec. 13, 2007

Related U.S. Application Data

(63) Continuation of application No. 11/092,516, filed on Mar. 29, 2005, now Pat. No. 7,261,122.

(51) Int. Cl.
*F16K 27/00* (2006.01)
(52) U.S. Cl. .................. 137/269; 285/133.21; 285/361
(58) Field of Classification Search ................ 137/269, 137/271; 285/69, 133.21, 361
See application file for complete search history.

*Primary Examiner*—John Fox
(74) *Attorney, Agent, or Firm*—The Ollila Law Group LLC

(57) ABSTRACT

A system and method for a valve for an expandable gas or fluid valve is disclosed. The valve comprises an electromagnetic switch with a male connector on one face, and a female connector on an opposite face. The electromagnetic switch has a passageway connecting the male connector with the female connector. An output port is switchably connected to the passageway by the electromagnetic switch. The male connector on one face can be coupled to the female connector on another electromagnetic switch, forming a line or chain of electromagnetic switches.

12 Claims, 18 Drawing Sheets

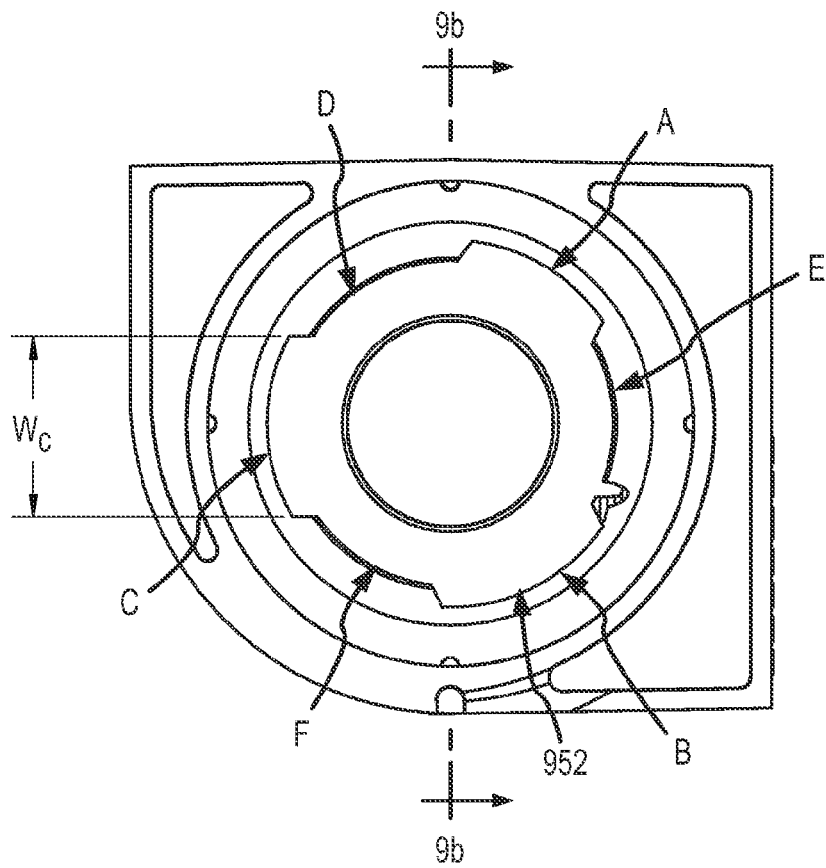
FIG. 9a
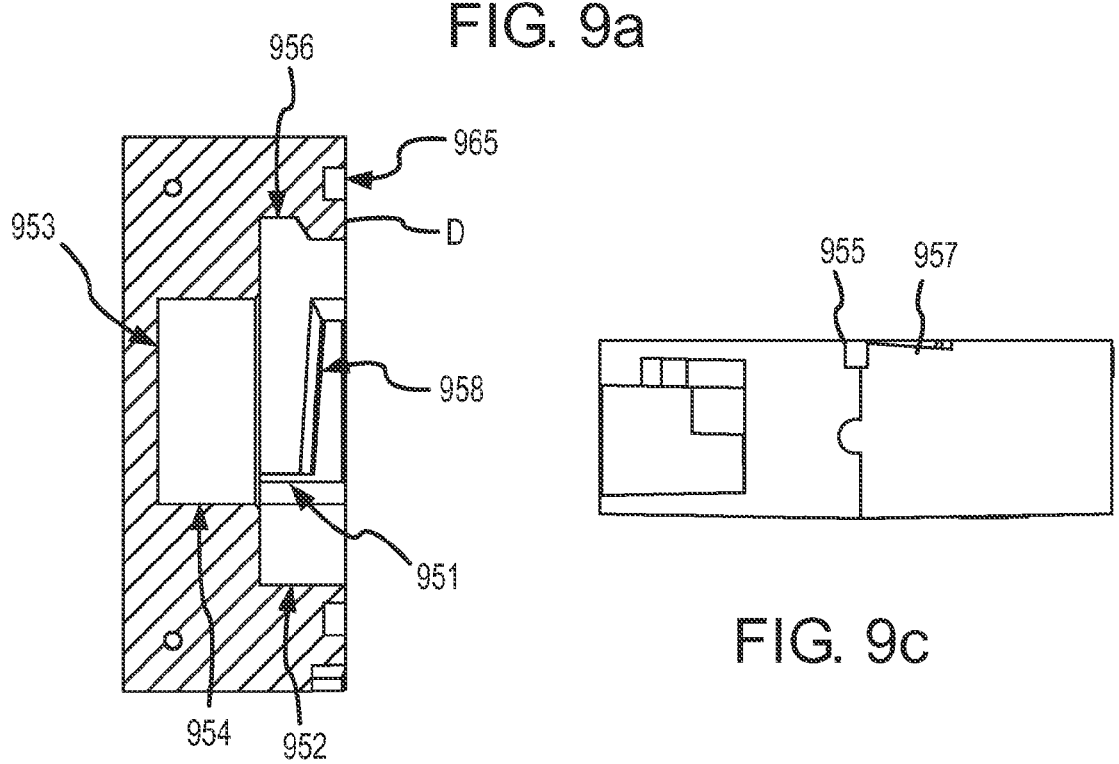
FIG. 9b
FIG. 9c

VALVE FOR AN EXPANDABLE GAS OR LIQUID DISTRIBUTION SYSTEM

RELATED APPLICATIONS

This application is a continuation of pending application 11/092,516, filed Mar. 29, 2005, entitled, "A VALVE FOR AN EXPANDABLE GAS OR FLUID DISTRIBUTION SYSTEM," hereby incorporated by reference into this application.

BACKGROUND OF THE INVENTION

1. Field of the Invention

The invention is related to the field of hydraulic and pneumatic systems, and in particular, to an expandable distribution system for hydraulics or pneumatics.

2. Description of the Prior Art

Large trucks and some cars may have a number of devices operated by air, for example an air horn. These vehicles may have an air switch in the cab that operates each of the devices. Having air switches in the cab creates a number of problems. One problem is that the air switches typically take up too much space in the cab. Another problem is that routing an air line to each switch is cumbersome and costly. The air system in vehicles is also typically hard to expand. Each air device must have its own connection to the air supply system, as well as a connection to the activation switch. To expand the system, for example to add an additional device, a new connection to the air supply must be made. Typically the new connection is chained off one of the current air lines using a T fitting. Finding space on a vehicle for the air distribution system is also a problem. Most vehicles also have a hydraulic system. The hydraulic system may have many of the same problems that the air or pneumatic system has.

Therefore there is a need for an expandable fluid or gas valve.

SUMMARY OF THE INVENTION

A system and method for a valve for an expandable gas or fluid valve is disclosed. The valve comprises an electromagnetic switch with a male connector on one face, and a female connector on an opposite face. The electromagnetic switch has a passageway connecting the male connector with the female connector. An output port is switchably connected to the passageway by the electromagnetic switch. The male connector on one face can be coupled to the female connector on another electromagnetic switch, forming a line or chain of electromagnetic switches.

BRIEF DESCRIPTION OF THE DRAWINGS

FIG. 9a is a front view of endcap 902 in an example embodiment of the invention.

FIG. 9b is a sectional view of endcap 902 in an example embodiment of the invention.

FIG. 9c is a bottom view of endcap 902 in an example embodiment of the invention.

DETAILED DESCRIPTION OF THE PREFERRED EMBODIMENT

FIGS. 1-14 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
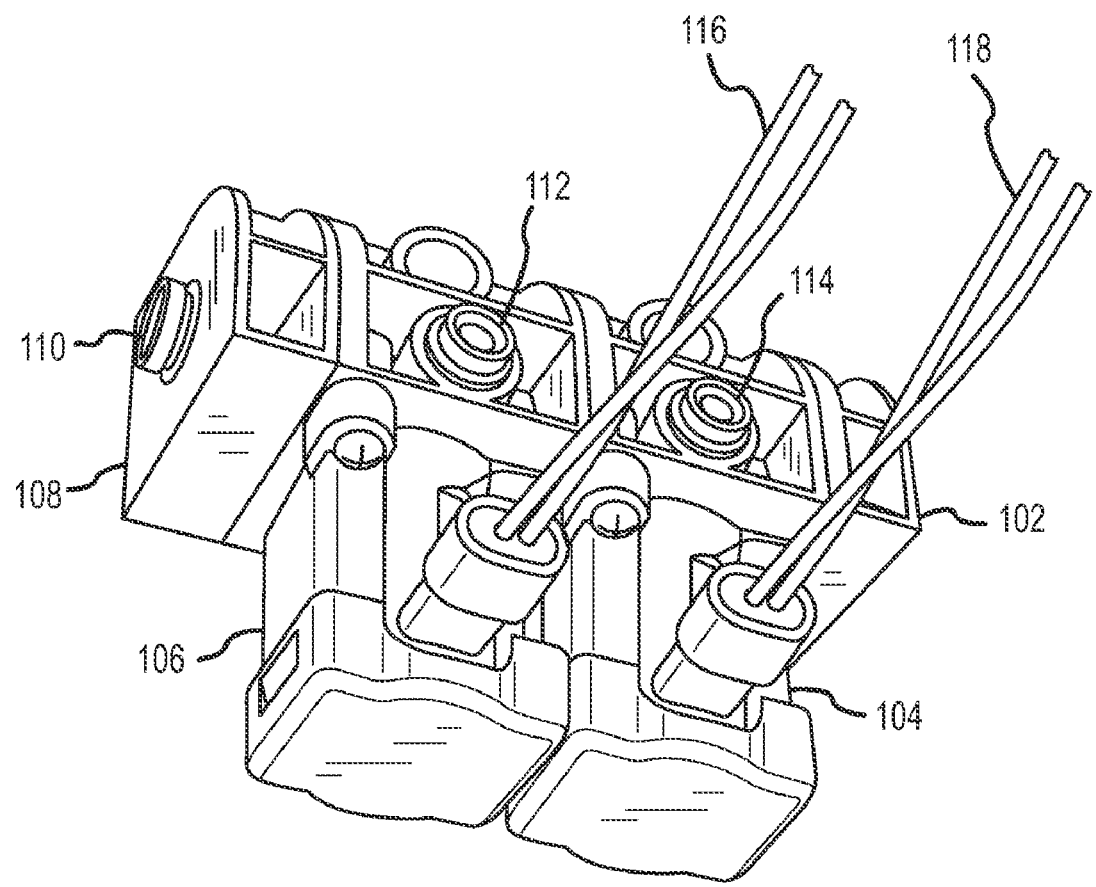
FIG. 1 is an isometric view of air distribution system 100 in an example embodiment of the invention.

FIG. 1 is an isometric view of air distribution system 100 in an example embodiment of the invention. Air distribution system 100 comprises endcap 102, base/solenoid assemblies 104 and 106, inlet piece 108, inlet fitting 110, output port fittings 112 and 114, and solenoid electrical control lines 116 and 118. Endcap 102 is removably connected to base/solenoid assembly 104. Base/solenoid assembly 104 is removably connected to base/solenoid assembly 106. Inlet piece 108 is removably connected to base/solenoid assembly 106. Inlet fitting 110 is installed in inlet piece 108. Output port fittings 112 and 114 are installed in base/solenoid assemblies 104 and 106. Solenoid electrical control lines 116 and 118 are installed in base/solenoid assemblies 104 and 106. Base/solenoid assemblies 104 and 106 are made from common parts and are essentially the same. In one example embodiment inlet fitting is a ⅜ inch push in fitting half cartridge) and output port fittings 112 and 114 are ¼ inch push in fittings (full cartridge). Other sizes may be used for the inlet fitting or for the output fittings.

In operation, an air source (not shown) would be connected to inlet fitting 110 using a first air line (not shown). A first air device (not shown) would be connected to output fitting 112 with a second air line and a second air device (not shown) would be connected to output fitting 114 with a third air line. Solenoid electrical control lines 116 would be connected to a first electrical switch (not shown) and solenoid electrical control lines 118 would be connected to a second electrical switch (not shown). When the first electrical switch is activated, the solenoid in base/solenoid assembly 106 would activate and pneumatically connect output port fitting 112 with the air supply connected to inlet fitting 110, thereby activating the first air device. When the second electrical switch is activated, the solenoid in base/solenoid assembly 104 would activate and pneumatically connect output port fitting 114 with the air supply connected to inlet fitting 110, thereby activating the second air device. When the first electrical switch is de-activated, the solenoid in base/solenoid assembly 106 would de-activate and disconnect output port fitting 112 with the air supply connected to inlet fitting 110, thereby de-activating the first air device. Other types of electrical connections may be used to connect the solenoid electrical control lines to the solenoids instead of the flying leads shown, for example Metri-pack electrical connectors.

Figure 2:
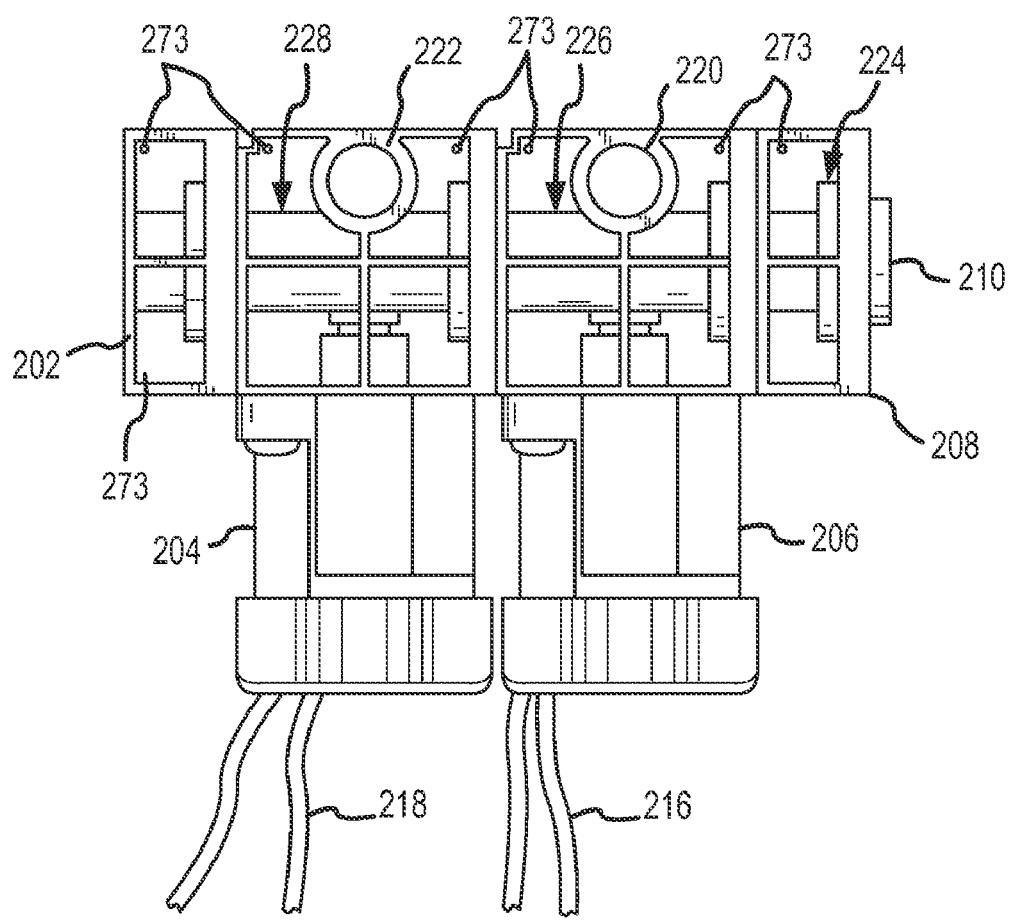
FIG. 2 is a rear view of air distribution system 200 in one example embodiment of the invention.
Figure 3:
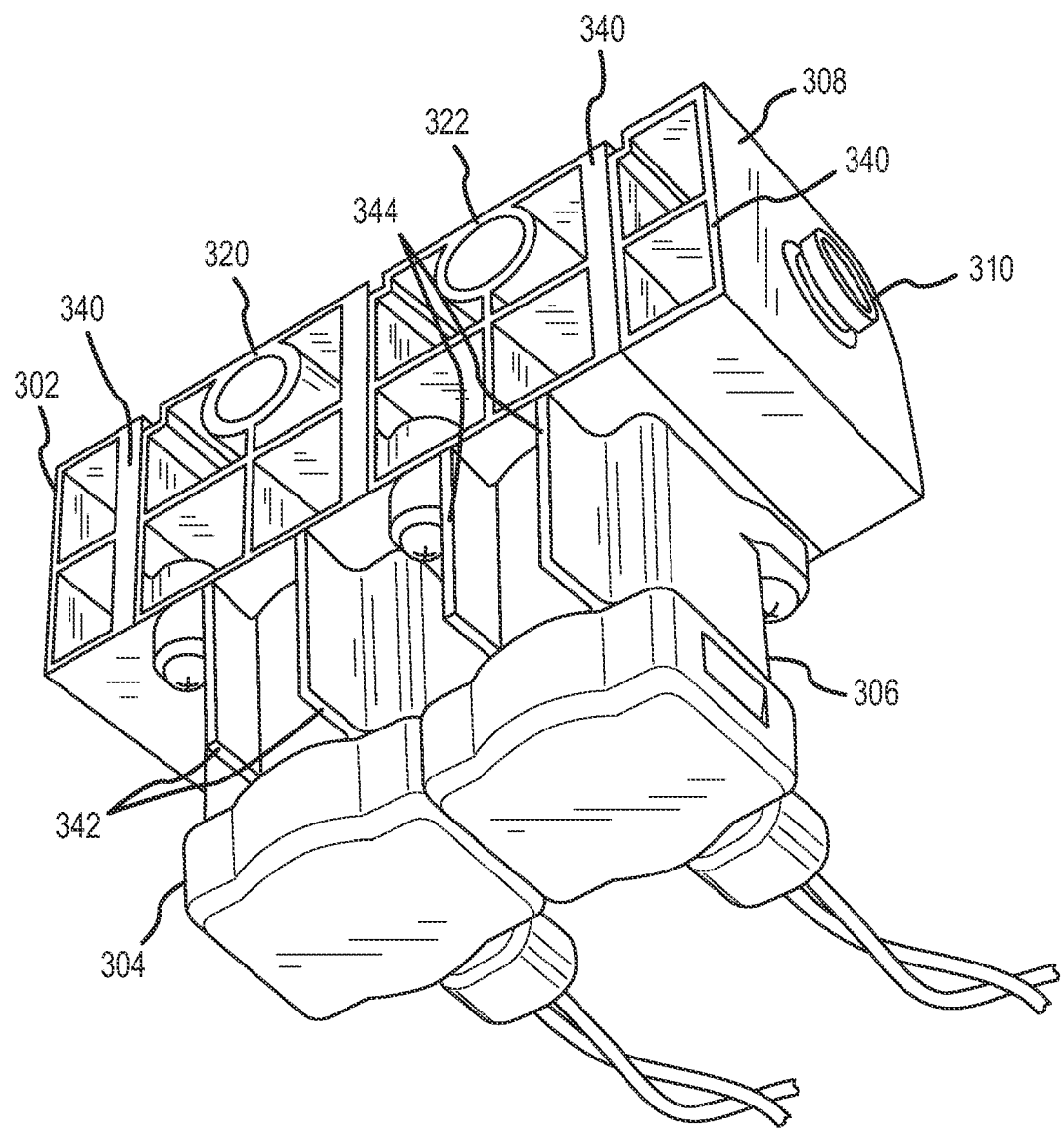
FIG. 3 is an isometric rear view of air distribution system 300 in one example embodiment of the invention.

FIG. 2 is a rear view of air distribution system 200 in one example embodiment of the invention. Air distribution system 200 comprises endcap 202, base/solenoid assemblies 204 and 206, and inlet piece 208 with inlet fitting 210 installed. In this view the mounting holes 220 and 222 can be more clearly seen. Mounting holes 220 and 222 go through the base/solenoid assemblies 204 and 206. In one example embodiment of the invention, crush sleeves (not shown) may be inserted into the mounting holes 220 and 222. The outer surface of air passageways 224, 226 and 228 can be seen in inlet piece, base/solenoid assembly 206 and base/solenoid assembly 204 respectively. Air passageways 224, 226 and 228 form a common air manifold fed by an air supply (not shown) when the air supply is attached to inlet fitting 210. Endcap 202 seals the end of the common air manifold. Drain holes 273 connect the cavities formed on the front side of the air distribution system with the cavities formed on the back side of the air distribution system and are configured to help prevent the buildup of moisture in the cavities when the air distribution system is mounted. Typically there will be at least one drain hole for each cavity FIG. 3 is an isometric rear view of air distribution system 300 in one example embodiment of the invention. Air distribution system 300 comprises endcap 302, base/solenoid assemblies 304 and 306, and inlet piece 308 with inlet fitting 310 installed. Mounting holes 320 and 322 go through the base/solenoid assemblies 304 and 306. Endcap 302, base/solenoid assemblies 304 and 306, and inlet piece 308 have surfaces that form a mounting face or surface 340 defined essentially by a common plane. In one example embodiment of the invention, mounting surface 340 includes the edges of each pair of support ribs 342 and 344 on base/solenoid assemblies 304 and 306 respectively. In another example embodiment of the invention, the mounting face or surface 340 on the solenoid may be formed from other features, for example one or more support posts, one or more horizontal ribs, only one Vertical rib, or the like. When bolts (not shown) are fastened through mounting holes 320 and 322, the bolts force the mounting face 340 of air distribution system 300 against a mounting surface, thereby supporting air distribution system.

Figure 4:
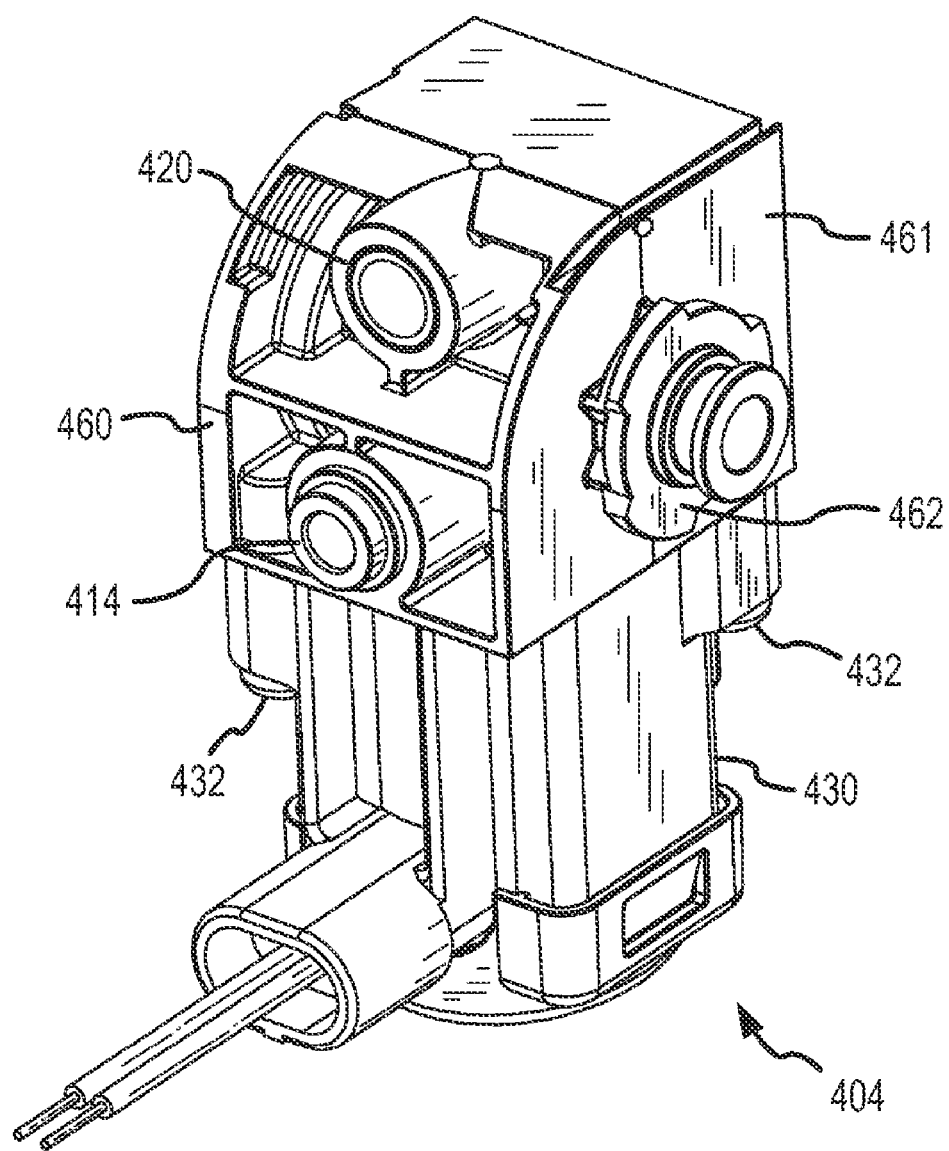
FIG. 4 is an isometric view of base/solenoid assembly 404 in one example embodiment of the invention.

FIG. 4 is an isometric view of base/solenoid assembly 404 in one example embodiment of the invention. Base/solenoid assembly 404 comprises solenoid assembly 430 attached to base assembly 460. In one example embodiment, solenoid assembly 430 is removably attached to base assembly with two screws 432. Other removable fastening devices may be used, for example clips, snap rings, bolts, or the like. In one example embodiment of the invention, the solenoid assembly may connect to the base assembly using a connector. For example the solenoid assembly may form the male part of a connector and the base assembly may form the female part of the connector. In another example embodiment, solenoid assembly 430 is permanently attached to base assembly (not shown). Any type of permanent attachment technique may be used, for example rivets, epoxy, sonic welding, or the like.

Base assembly 460 in the base/solenoid assembly 404 has the male part 462 of a connector on face 461 of base assembly 460. The equivalent female part 464 (not shown) of the connector is on a face opposite face 461 of base assembly 460. The male part 462 of the connector in base/solenoid assembly 404 is used to connect the base/solenoid assembly to a corresponding female part of a connector in an endcap (not shown) when the base/solenoid assembly is at one end of an air distribution system. The male part 462 of the connector in the base/solenoid assembly is used to couple the base/solenoid assembly to a corresponding female part of another base/solenoid assembly when the base/solenoid assembly is in the middle of a chain of base/solenoid assemblies, or when the base/solenoid assembly is at the other end of the air distribution system.

Figure 5:
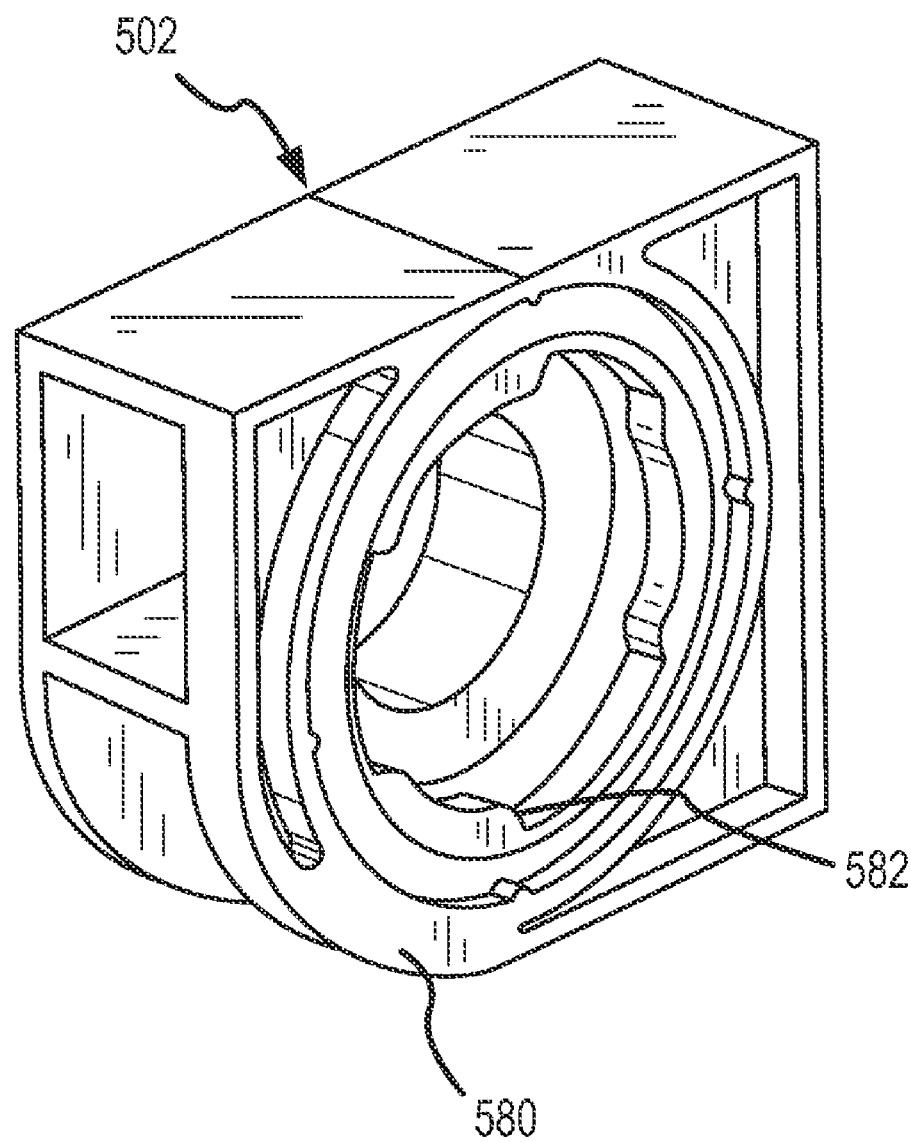
FIG. 5 is an isometric view of endcap 502 in one example embodiment of the invention.

FIG. 5 is an isometric view of endcap 502 in one example embodiment of the invention. Endcap has side or face 580 that forms the female part 582 of the connector. The male part 462 of the connector on base/solenoid assembly 404 is configured to mate with, and removably couple to, the female part 582 of the connector on endcap 502. The face opposite face 580 on endcap 502 forms a seal and seals one end of the air passageway in the base part 460 of base/solenoid assembly 404 when the endcap is coupled to the base/solenoid assembly. Additional base/solenoid assemblies may be removably coupled to the female part 464 of base/solenoid assembly 404 with the corresponding male part of the connector on the additional base/solenoid assemblies.

Figure 6:
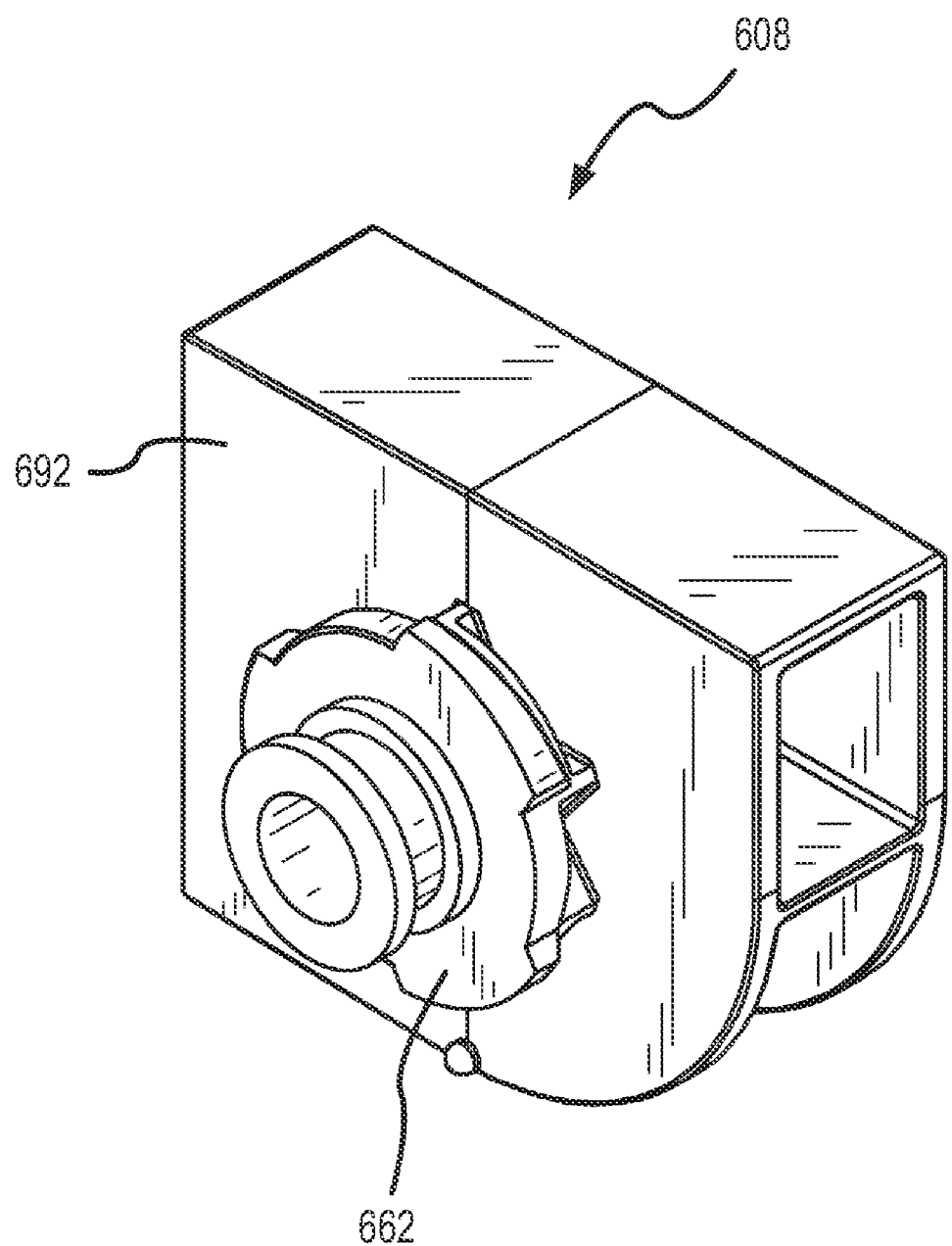
FIG. 6 is an isometric view of inlet piece 608 in one example embodiment of the invention

FIG. 6 is an isometric view of inlet piece 608 in one example embodiment of the invention. Inlet piece 608 has the male part 662 of the connector on face 692 of inlet piece 608. The face opposite face 692 is adapted to accept inlet fixture 610 (not shown). The male part 662 of the connector on inlet piece 608 is used to removably couple the inlet piece 608 to the female part 464 of the connector on a base/solenoid assembly 404.

In the example embodiments of the invention shown in FIGS. 4-6, a female part of the connector was on the endcap and a male part of the connector was on the inlet piece, with the base/solenoid assemblies having both a male and a female part of the connector on opposite faces. In another example embodiment of the invention, the endcap would have a male part of the connector, the inlet piece would have a female part of the connector, and the base/solenoid assemblies would have the male and female parts of the connectors swapped.

An air distribution system is created by removably coupling a first base/solenoid assembly with an endcap. Additional base/solenoid assemblies may be removably coupled to the first base/solenoid assembly. Once the selected number of base/solenoid assemblies have been attached, a input piece is removably coupled to the last base/solenoid assembly. The assembled air distribution system can be mounted by fastening bolts through the mounting holes in each base/solenoid assembly. Once mounted, the air supply can be connected to the air inlet fitting, the air devices can be connected to the output port fittings, and the solenoid electrical control lines can be connected to their respective electrical switches. As can be appreciated by one skilled in the art, the order the parts are assembled to form the air distribution system is unimportant As describe above there are three main pieces that are used to create one example embodiment of the invention, an endcap, an inlet piece, and one or more base/solenoid assemblies. In another example embodiment of the invention, there may be three different pieces, for example a base/solenoid assembly with one end sealed, a base/solenoid assembly with an inlet piece integrated into one side, and one or more base/solenoid assemblies with a male and female connector on opposite faces.

The number of base/solenoid assemblies that can be chained together is limited only by the pressure and flow of the air supply system. In a first example embodiment of the invention, between 1 and N base/solenoid assemblies are chained together with a single connection to the air supply system. In this configuration the single air supply connection is typically made at the inlet fixture on the inlet piece. The number N can vary due to a number of factors including: the size of the common manifold formed by the air passageways in the chain of linked base/solenoid assemblies, the flow rate or amount of air used by the different air devices, the pressure of the supply system, the probability or likelihood of all of the air devices being activated at the same time, the size of the inlet opening, and the like. In one example embodiment of the invention, with a 3/8 inch inlet fitting the number N is approximately 5 for one connection to the air supply source. In another example embodiment, with a 1/2 inch inlet fitting N would be approximately 16.

In a second example embodiment of the invention, the air distribution system uses multiple connections to the air supply system to allow a longer chain of base/solenoid assemblies to be linked together. One of the connections to the air supply system is typically at the inlet fixture on the inlet piece. Additional connections to the air supply system can use the output ports on some of the base/solenoid assemblies. In one example embodiment of the invention, a solenoid with an additional air supply connected to its' output port can be locked open such that the output port is always coupled to the common manifold, or can be opened only when additional air supply flow is needed. In another example embodiment the solenoid assembly may be replace with a cap attached to a base assembly that seals the opening in the base assembly where a solenoid usually attaches. This would allow the output port to be permanently connected to the common air passageway. In another example embodiment of the invention, the base may be modified to seal the top of the base part, and the output port would be used to couple to an additional air supply line. In another example embodiment, the output port could be sealed and the additional air supply could attach to a inlet fixture in the top of the base part. Another way additional air supplies may be attached is replacing the endcap with an inlet piece that has a connector that matches the connector on the endcap. For example, if the normal inlet piece had a male connector, the replacement inlet piece would have a female connector. In this way there would be an inlet piece at each end of the distribution system.

The additional connections to the air supply system may be made every M base/solenoid assemblies, for example every 6$^{th}$ base/solenoid assembly may be connected to the air supply. The number M can also vary due to some of the same factors discussed above including: the size of the common manifold formed in the chain of linked base/solenoid assemblies, the flow rate or amount of air used by the different air devices, the pressure of the supply system, the probability or likelihood of all of the air devices being activated at the same time, and the like.

Figure 7A:
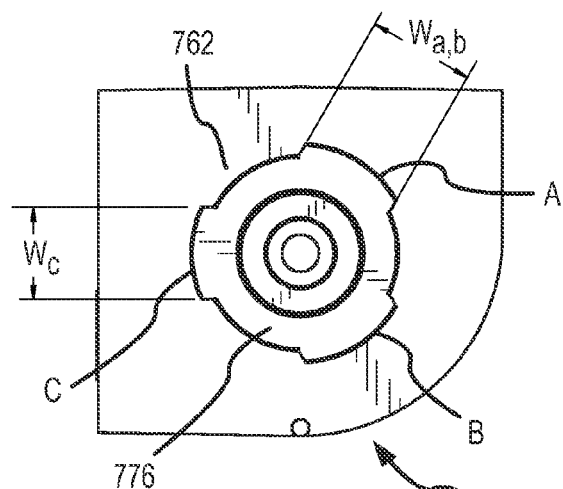
FIG. 7a is a front view of inlet piece 702 in one example embodiment of the invention.
Figure 7B:
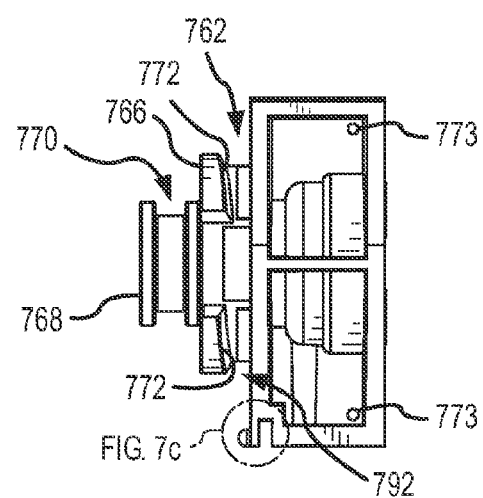
FIG. 7b is a side view of inlet piece 702 in one example embodiment of the invention.
Figure 8:
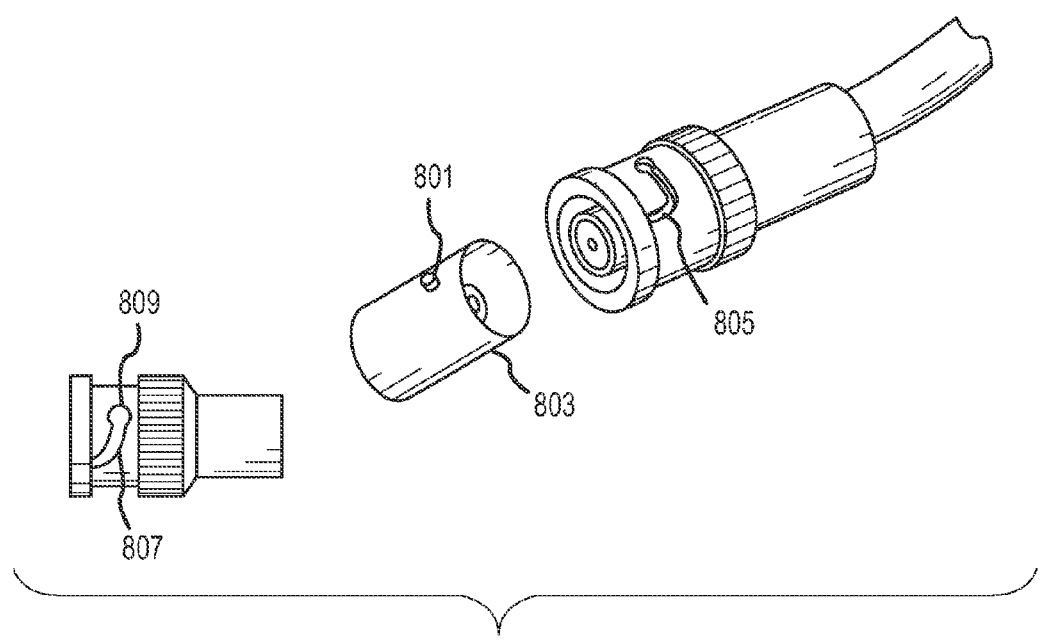
FIG. 8 is a drawing of a typical BNC connector.

FIG. 7a is a front view of inlet piece 702 in one example embodiment of the invention. The male part 762 of a connector is formed on the front face of inlet piece 702. In this example embodiment the connector type is a modified Bayonet Nut Coupling (BNC) connector, but other connector types may be used, for example a quick release coupler. An example quick release coupler is part number TA-5K from Macnaught USA, inc. (www.macnaught.com). FIG. 8 is a drawing of a typical BNC connector, A BNC connector typically has pins or protrusions 801 that extend from a cylindrical barrel 803. The pins mate with and are inserted into channels or slots 805 in the corresponding female part of the connector. The channels or slots 805 typically form a ramp 807 that the pins follow when the male part of the connector is inserted and then rotated with respect to the female part of the connector. As the pins 801 follow the channel or slot ramps 807 during the rotation, the two parts of the connectors are forced together. Some BNC connectors only have one pin or protrusion extending from the cylindrical barrel, but most BNC connectors have two or more pins space symmetrically around the cylindrical barrel. The basic BNC connector can be modified in a number of ways. One modification is to change the shape of the pins or protrusions and the shape of the channels such that the ramp is formed on the back side of the protrusions and the channel is a straight slot or groove. Another modification is to have a ramp formed on both the male protrusions and on the female channels. Another modification is to enclose the slots or channels on the female part of the connector. The modified BNC connector in FIGS. 7a and 7b have the ramps formed on both the male protrusions and on the female channels and have the channels on the female part enclosed.

The male part 762 of the connector in FIG. 7a has three protrusions A, B, and C extending from a cylindrical part or barrel. The three protrusions A, B, and C are spaced symmetrically around the cylindrical barrel. FIG. 7b is a side view of inlet piece 702 in one example embodiment of the invention. Surface 766 forms the front face of the male part 762 of the connector. The back sides of the protrusions A, B, and C, form ramps 772 configured to act against the corresponding channels or slots in the female part of the connector to force the two parts of the connectors together when one connector part is rotated with respect to the other connector part. The male part of the connector also has cylindrical extension 768 that forms O-ring groove 770. Optional drain holes 773 connect the cavities formed by the structure of the endcap and are configured to help prevent the buildup of moisture trapped in the cavities.

FIG. 9a is a front view of endcap 902 and FIG. 9b is a sectional view of endcap 902 in an example embodiment of the invention. The corresponding female part of the modified BNC connector from FIGS. 7a and 7b is formed in the surface of endcap 902. The female part of the connector has a first inner cylindrical surface 952. Lips D, E, and F are symmetrically placed around the end of the cylindrical surface 952 and extend inward from cylindrical surface 952. Lips D, E and F form openings A, B, and C that correspond to protrusions A, B, and C on the male part 762 of the connector shown in FIGS. 7a and 7b. Lips D, E, and F form three channels that are configured to retain the three protrusions A, B, and C of male part 762 of the connector. Channel 956, formed by lip D, can be seen in FIG. 9b). The inner surface of lips A, B and C form ramps 958 configured to act against the corresponding protrusions in the male part of the connector to force the two parts of the connectors together when one connector part is rotated with respect to the other connector part. In one example embodiment of the invention openings A, B, and C in the female part of the connector and protrusions A, B, and C on the male part of the connector are all the same size. In another example embodiment one or more of the protrusions and one or more of the openings is a different size than the other protrusions and openings, for example opening A may be larger with corresponding protrusion A being larger. The other openings B and C may be the same size but smaller tan opening A, with the corresponding protrusions C and D being the same size but smaller than protrusion A. The different sized protrusion and opening act as a key that allows the male part of the connector to be inserted into the female part of the connector in only one orientation. Other features may be used as a key, for example an unsymmetrical spacing of the protrusion around the cylinder may be used as a key to restrain insertion of the male part of the connector into the female part of the connector to only one orientation.

Lip E has an optional orientation lock 951 that extends from the bottom end of the ramp down to the face of first inner cylindrical surface 952. The orientation lock 951 is configured to prevent any rotation in a direction opposite the direction of rotation used to couple the male and female parts of the connectors together. In another embodiment of the invention, there may be multiple orientation locks.

A second inner cylindrical surface 954 is formed in endcap 902 corresponding to cylindrical extension 768. Cylindrical surface 954 has been sized to form a pneumatic seal with an O-ring captured in O-ring groove 770 of cylindrical extension 768. The end of the second cylindrical surface is sealed by face 953. A second O-ring groove 965 is formed in the front face of endcap 902. An O-ring captured in O-ring groove 965 forms a seal with corresponding surface 792 when the male part 762 of the connector is engaged with, and coupled to, the female part 982 of the connector. The second O-ring may be used as a secondary pneumatic seal, as an environmental seal to keep dust and debris away from the interior surfaces, or as a combination of an environmental seal and a pneumatic seal.

Figure 7C:
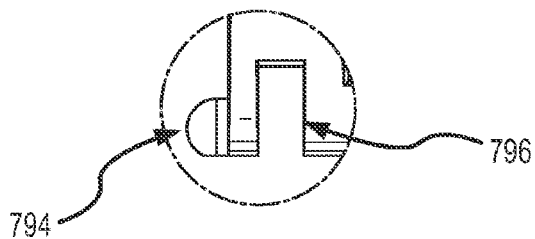
FIG. 7c is a detailed view of inlet piece 702 in one example embodiment of the invention.

Most BNC connectors have a locking feature that helps prevent the connector from coming apart unintentionally. There are numerous ways the locking feature can be implemented. The locking feature 809 for the BNC connector shown in FIG. 8 is a section at the end of the channel with a reverse slope to the ramp. Once the pins are rotated all the way into the reverse sloped section, the pins are typically held in place by the spring force of an O-ring that seals the connection. The locking feature for the modified BNC connector shown in FIGS. 7 and 9 is a locking bump, pin or protrusion 794 on the male part of the connector that snaps into a corresponding locking hole 955 in the female part of the connector. FIG. 9c is a bottom view of endcap 902 in an example embodiment of the invention. The locking bump or protrusion 794 is located on a cantilevered feature of the endcap such that the cantilevered feature forms a spring that allows the locking bump or protrusion 794 to snap into place in the corresponding locking hole 955 in the female part of the connector. The cantilevered feature is formed by a slot 796 cut into the face of the endcap. In one example embodiment of the invention, a locking ramp 957 may be adjacent to the locking hole 955. When the male part of the connector is first coupled to the female part of the connector, the locking protrusion is aligned with the end of the ramp farthest from the locking hole 955. As the male part of the connector is rotated with respect to the female part of the connector, the locking protrusion 794 follows the locking ramp 957 up until the locking protrusion 794 snaps into the locking hole 955. The locking protrusion mated into the locking hole helps lock the two parts of the connectors together. The mating of the locking pin with the locking hole also creates a positive stop that helps prevent over rotation of the male part of the connector with respect to the female part of the connector.

Base/solenoid assembly 404 has the male part 462 of the modified BNC connector on one face 461 and the corresponding female part of the modified BNC connector (not shown) on an opposite face and is configured to mate with and couple to the corresponding connectors on the endcap, the inlet piece, and other base/solenoid assemblies. Base/solenoid assembly 404 comprises solenoid assembly 430 and base assembly 460.

Figure 10A:
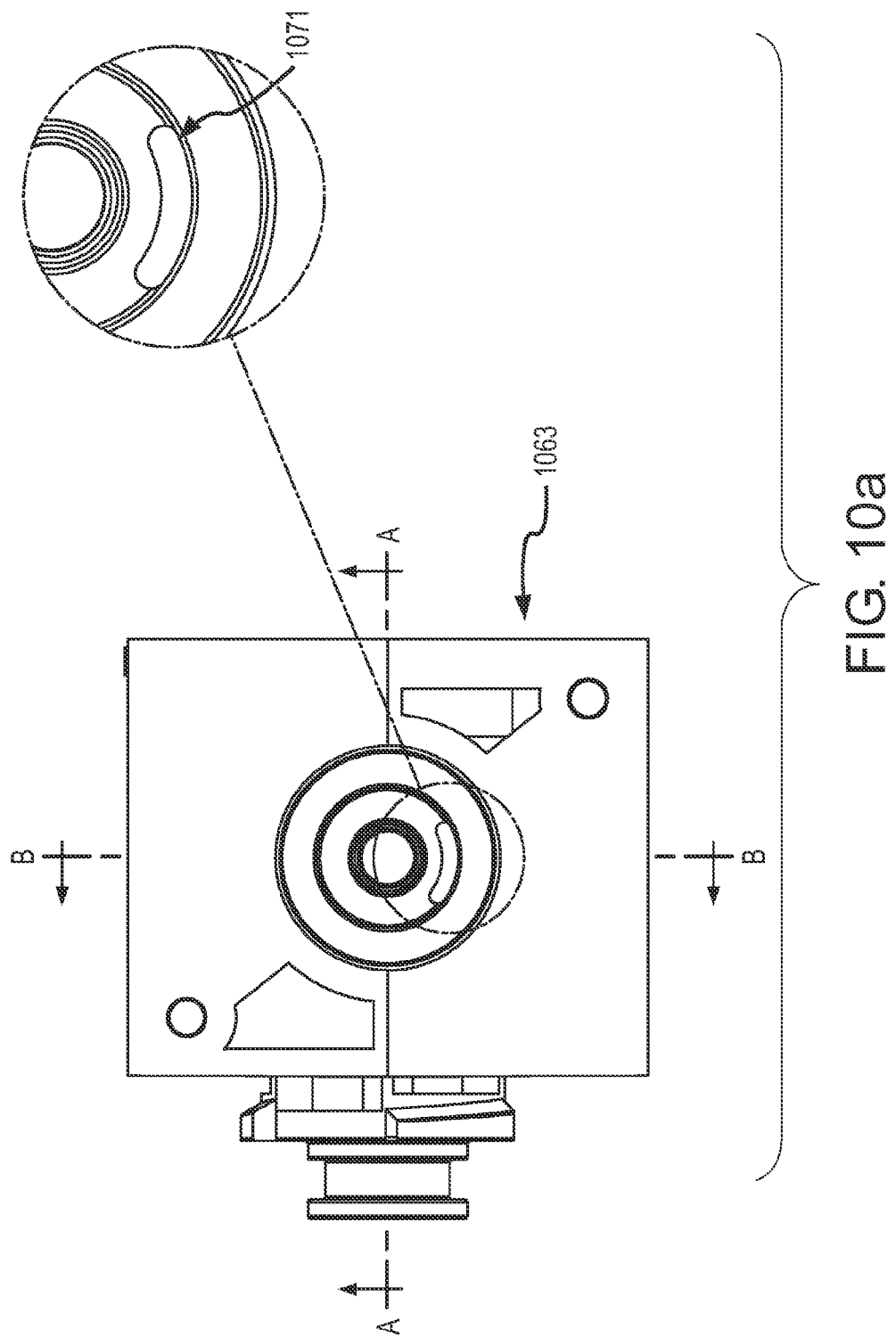
FIG. 10a is a top view of a body 1063 in an example embodiment of the invention.
Figure 10B:
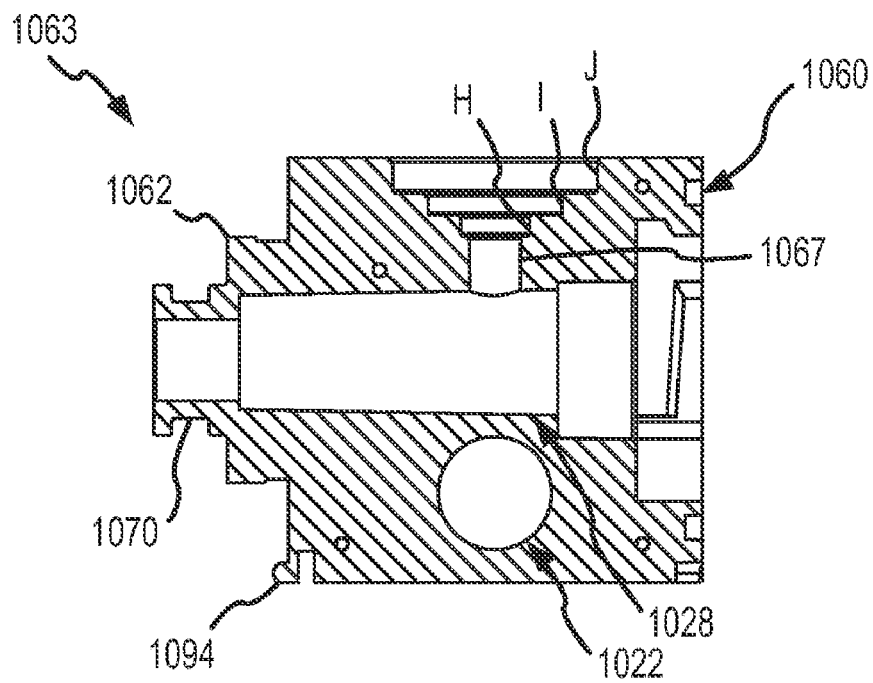
FIG. 10b is a first sectional view of a body 1063 in an example embodiment of the invention.

Base assembly 460 comprises body 463, a first O-ring, a second O-ring (not shown), output port fitting 414, and crush sleeve (not shown). FIG. 10a is a top view of body 1063 in an example embodiment of the invention. FIG. 10b is sectional view AA of body 1063 from top view 10a. FIG. 10b shows the male part 1062 of the connector with the first O-ring grove 1070 on the cylindrical extension. The locking protrusion 1094 and the mounting hole 1022 are also shown in this view. Air passageway 1028 is formed from a number of bores passing through the body 1063. Air passageway 1028 is generally centered on and runs between the male part 1062 of the connector on one side of the body and the female part of the connector on an opposite side of the body. The shape of air passageway is generally not important and could be cylindrical, rectangular, cylindrical with a flat side, or the like. Air passageway is configured to form a common air manifold with other air passageways when additional bodies are removably coupled to body 1063 with the male or female part of the connector.

Figure 10C:
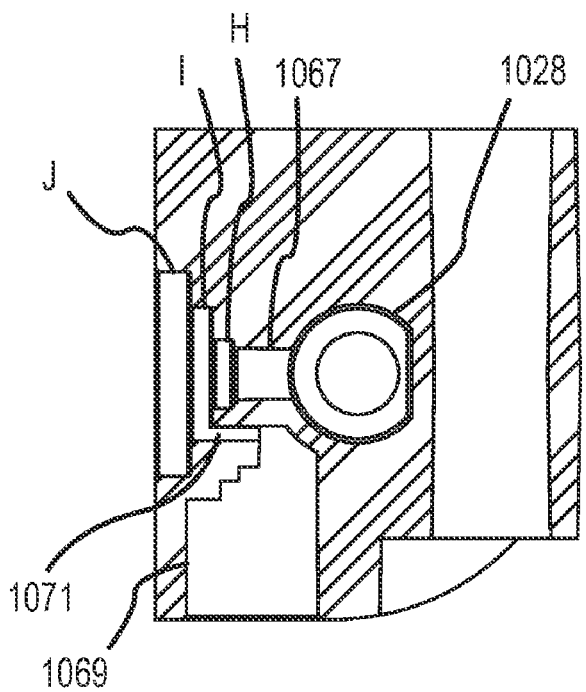
FIG. 10c is a second sectional view of a body 1063 in an example embodiment of the invention.

Hole 1067 intersects with and pneumatically couples to air passageway 1028. Cylindrical bores H, I and J are concentric with hole 1067, where each cylindrical bore is larger that the previous cylindrical bore. Cylindrical bores H, I and J form a series of concentric steps between the end of hole 1067 and the top of the body 1063. FIG. 10c is another sectional view BB of body 1063 from top view 10a. FIG. 10c shows output port 1069 that is generally perpendicular to air passageway 1028. Output port 1069 does not intersect air passageway 1028. Hole 1067 intersects with air passageway 1028. Slot 1071 is formed in the bottom of cylindrical bore I. Slot 1071 can bee seen in detail C of FIG. 10a and in FIG. 10c. Slot 1071 intersects with output port 1069 and forms a channel that couples air passageway 1028 with output port 1069 through hole 1067 and cylindrical bores H and I.

Figure 11A:
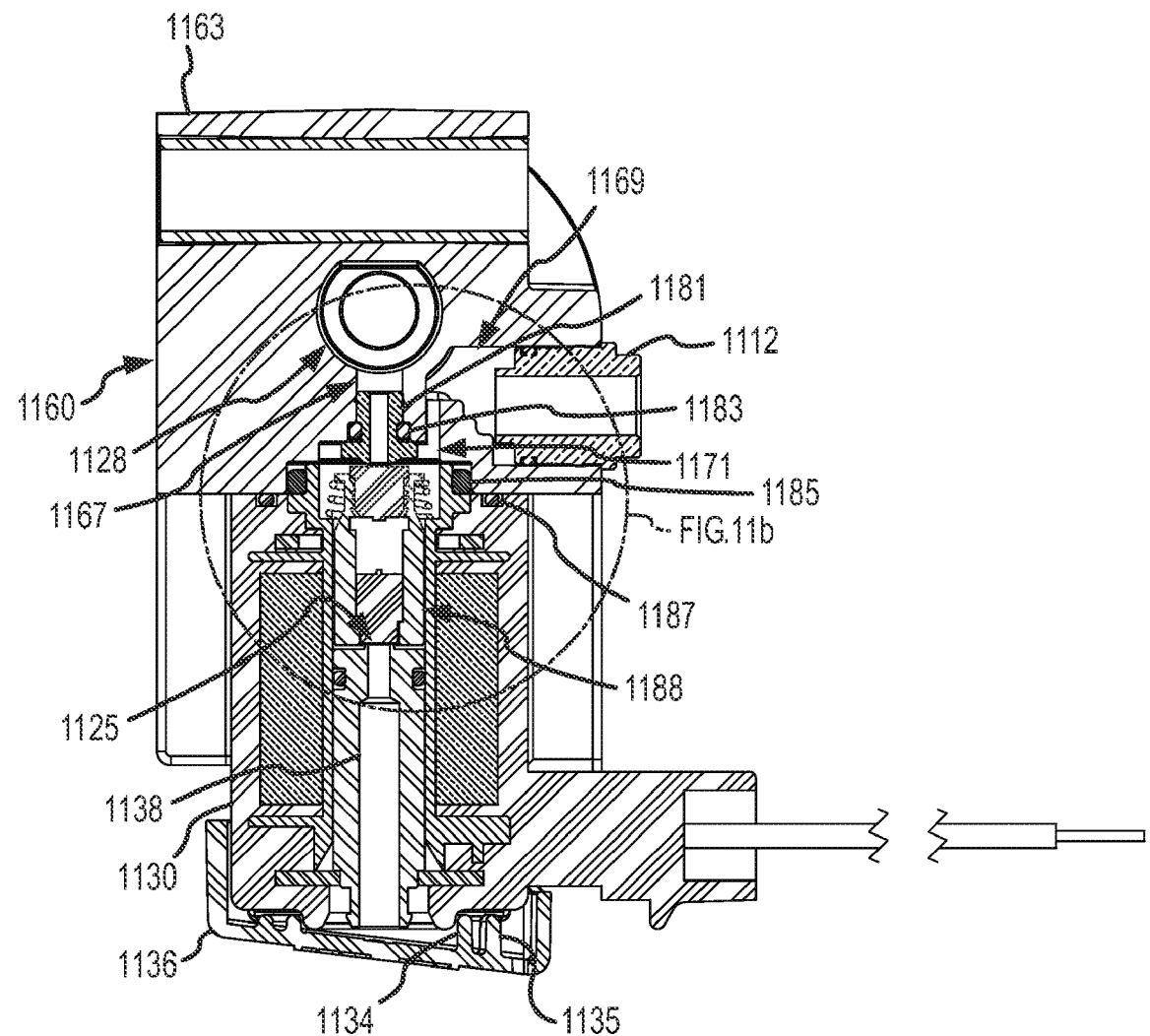
FIG. 11a is a sectional view of base/solenoid assembly 1104 in an example embodiment of the invention.

FIG. 11a is a sectional view of base/solenoid assembly 1104 in an example embodiment of the invention. Solenoid assembly 1130 is attached to base assembly 1160. Base assembly comprises body 1163 with output fitting 1112 installed in output port 1169. Base assembly 1160 contains solenoid valve 1181 installed in hole 1167 with O-ring 1183 forming a pneumatic/hydraulic seal against cylindrical bore H. Solenoid valve 1181 is approximately the same diameter as hole 1167. Hole 1167 intersects with air passageway 1128. Solenoid valve 1181 mates with and is press fit into hole 1167. Solenoid valve has a cylindrical passageway passing through solenoid valve that allows air or fluids to pass through.

Figure 11B:
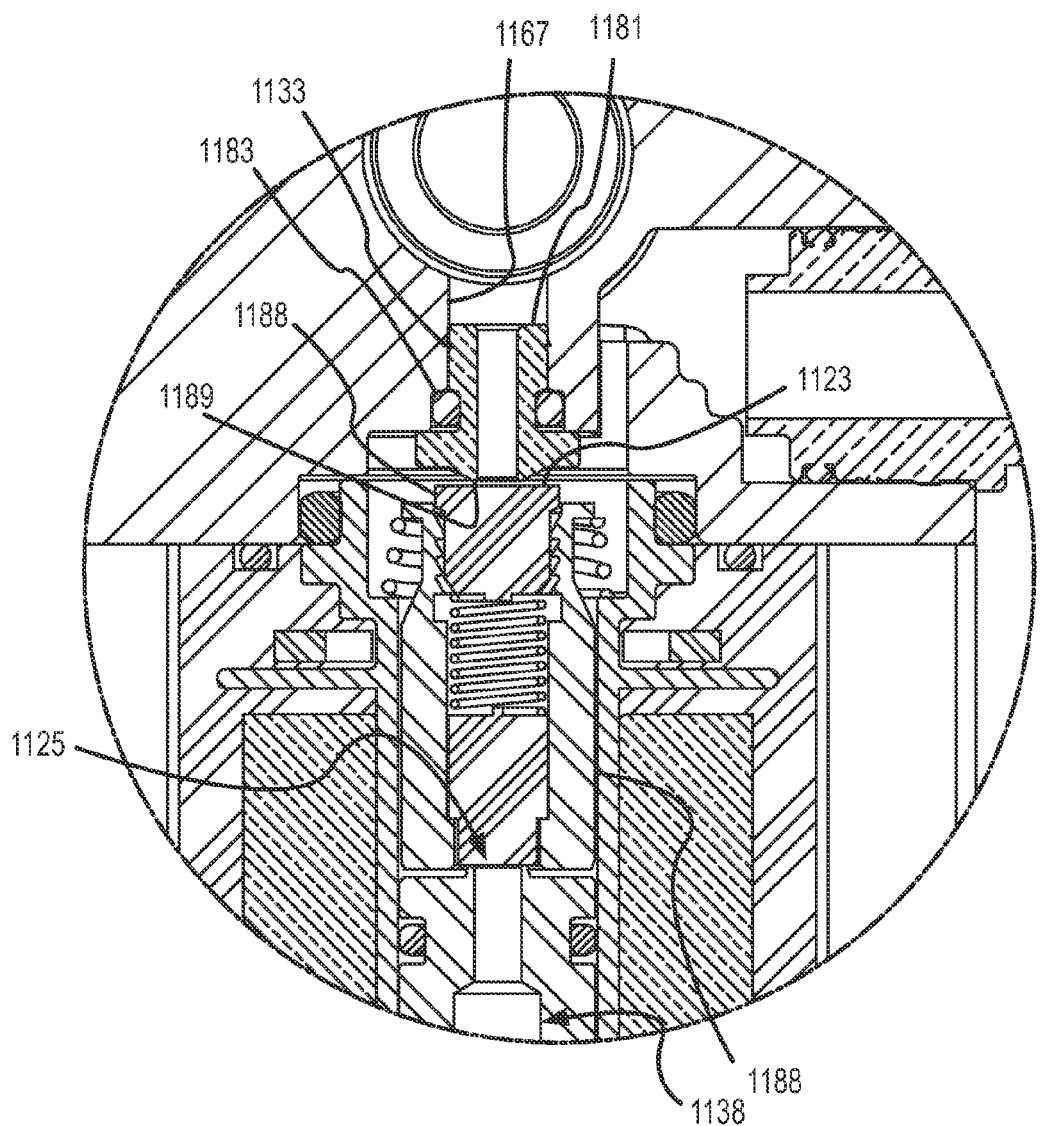
FIG. 11b is a detailed view of base/solenoid assembly 1104 from an area in sectional view 11a in an example embodiment of the invention.

FIG. 11b is a detailed view from FIG. 11a showing the area around the solenoid valve in one example embodiment of the invention. Barbs 1133 help retain solenoid valve in hole 1167. Solenoid valve is configured to retain O-ring 1183. O-ring 1183 is sized to form a radial seal against cylindrical bore H when the solenoid valve is installed. O-ring 1183 may also form a seal against the shoulder formed by the face of cylindrical bore H. The first part of solenoid valve that is inserted into hole 1167 contains barbs 1133. The first part of solenoid valve that is inserted into hole 1167 also has a smaller diameter than O-ring 1183. O-ring 1183 forms a seal with bore H and not with the inner diameter of hole 1167. This allows O-ring 1183 to form the radial seal against a surface that has not been marred by barbs 1133 during insertion of solenoid valve 1181 into hole 1167.

Solenoid plunger 1188 is part of a solenoid. Solenoids are well known in the art as an electromagnetic device that can move a plunger from one position to another position when the solenoid is activated. Typically the plunger is held in a closed position with a spring, and is held in an open position by an electromagnetic force when the solenoid is activated. However, the solenoid may be configured to have the spring hold a plunger in the open position and the electromagnetic force hold the plunger in the closed position. Some solenoids use the electromagnetic force to hold the plunger in both positions. The solenoid shown in FIG. 11 is a sleeveless design (Sleeveless because the plunger rides inside the plastic bobbin instead of a stainless steel sleeve inside the bobbin). A sleeveless design is typically cheaper than a design using a sleeve, however a design using a sleeve typically can last for more cycles. The current invention may use either a sleeveless design or a design that incorporates a sleeve.

In the closed position (not shown), face 1123 of solenoid plunger 1188 contacts, and seals against, rim 1189 of solenoid valve 1181, preventing air from air passageway 1128 from reaching output port 1169. In the closed position face 1125, on the opposite end of solenoid plunger 1188 from face 1123, does not contact the ridge at the end of exhaust channel, allowing pressurized air from output port to vent through slots (not shown) formed from one end of solenoid plunger 188 to the other end of solenoid plunger, and out through exhaust channel 1138.

When Solenoid plunger 1188 is in the open position, solenoid plunger 1188 does not contact the rim 1189 of solenoid valve 1181, and face 1123 does not form a seal against rim 1189, thereby allowing air to flow from air passageway 1128, through hole 1167, through solenoid valve 1181 and into cylindrical bore I, through slot 1171 and into output port 1169. In the open position, face 1125 mates with and seals against the ridge formed at one end of exhaust channel 1138 forming a seal between the solenoid plunger and the exhaust channel. This seal prevents flow from air passageway 1128 to exhaust channel 1138.

Solenoid assembly 1130 contains O-rings 1185 and 1187. O-ring 1185 forms a pneumatic seal between solenoid assembly 1130 and base assembly 1160. O-ring 1187 forms an environmental seal between solenoid assembly 1130 and base assembly 1160.

The solenoid shown in FIG. 11 uses a linear motion to open and close an air channel between an air passageway and an output port thereby connecting an air device with an air supply. This invention is not limited to using linear motions to connect the air devices with an air supply. Other types of motion and other types of valves or switches are envisioned. For example, a solenoid may be configured to translate a linear motion into a rotary motion that opens and closes a ball valve. In another example of the invention, a motor may be used to cause a rotary motion that opens/closes a butterfly valve when activated. Generally, any type of electromagnetic switch or valve can be used with this invention.

Figure 12A:
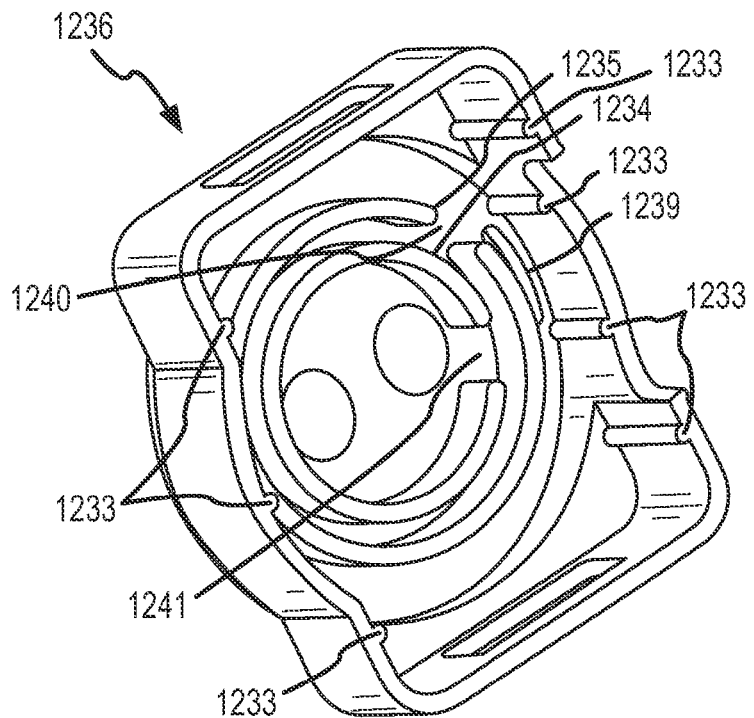
FIG. 12a is a first isometric view of an exhaust cap 1236 in an example embodiment of the invention.
Figure 12B:
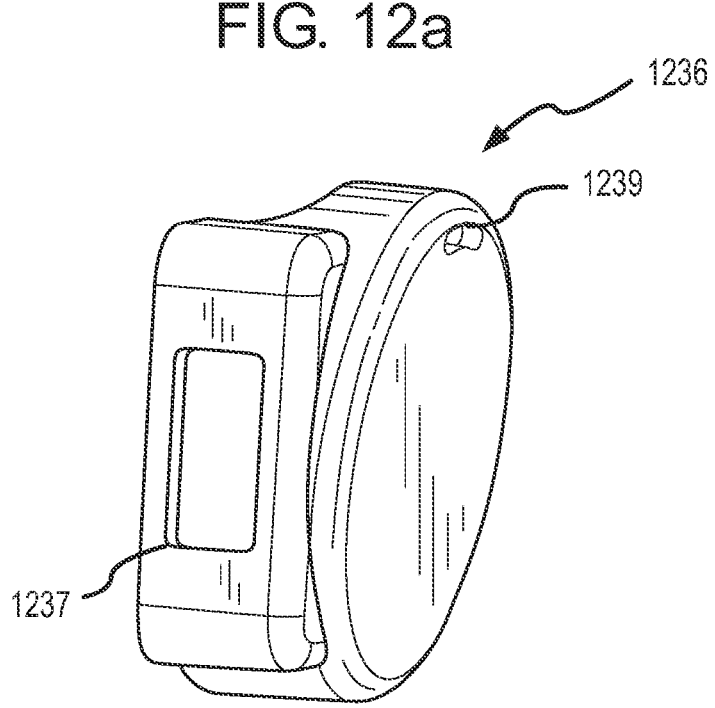
FIG. 12b is a second isometric view of an exhaust cap 1236 in an example embodiment of the invention.

FIG. 11 shows exhaust cap 1136 installed on solenoid assembly 1130. FIG. 12 is an isometric view of exhaust cap 1236 in one example embodiment of the invention. Exhaust cap is configured to direct any liquid exhaust coming from base/solenoid assembly 1160/1130 through ridge gaps 1240 and 1241, toward drain 1239. Exhaust cap is also configured to direct gas exhaust to controlled gaps between exhaust cap 1136 and the solenoid assembly 1130 along the edges of the exhaust cap. Exhaust typically occurs at the end of the activation sequence for a device. When solenoid is activated and solenoid plunger 1188 is drawn away from solenoid valve 1181, pressurized air from the air passageway 1128 is forced into output port 1169 and into an air line (not shown) installed in output port fixture and coupled to an air device (not shown), activating the air device. Once the solenoid is deactivated and plunger 1188 has re-sealed solenoid valve 1181, any pressurized air in the air line or in the air device is released back through output port 1169 and slot 1171 and into exhaust channel 1138, exiting through the bottom of solenoid assembly. Air systems may contain liquid containments, for example condensation, oil, or the like, that is passed through the system and exhausted from the bottom of solenoid assembly.

In one example embodiment of the invention, exhaust cap 1136 is constructed from a somewhat flexible material and is snapped onto solenoid assembly 1130 using clips that fit through openings 1237. Any other mechanical fastening technique may be used to attach exhaust cap to solenoid assembly. Spacing ribs 1233 placed along opposite inside edges of exhaust cap 1136 maintain a controlled gap between exhaust cap 1136 and the solenoid. Exhaust gas flows through the controlled gap between exhaust cap and the solenoid along both edges of exhaust cap as well as through channels formed by ridges 1234 and 1235. Ridges 1234 and 1235 form two partial concentric circles, where each ridge forms at least one gap (1240 and 1241) in the circle. Exhaust channel 1138 exits into the central area formed by ridges 1234 and 1235 when exhaust cap is mounted onto solenoid assembly 1130. Liquid exiting exhaust channel 1138 is directed by ridges 1234 and 1235, through the gaps 1240 and 1241 and towards drain 1239. Ridges 1234 and 1235 help prevent any other liquids or debris that may fall through the controlled opening, from reaching exhaust channel 1138, by directing the flow around exhaust channel towards drain 1239. The ridges shown in FIG. 12 are generally circular, but other shapes may be used. FIG. 11c shows that ridges 1134 and 1135 vary in height causing the surface of the exhaust cap to tilt towards drain 1139 when exhaust cap is installed on solenoid assembly 1130.

Figure 13:
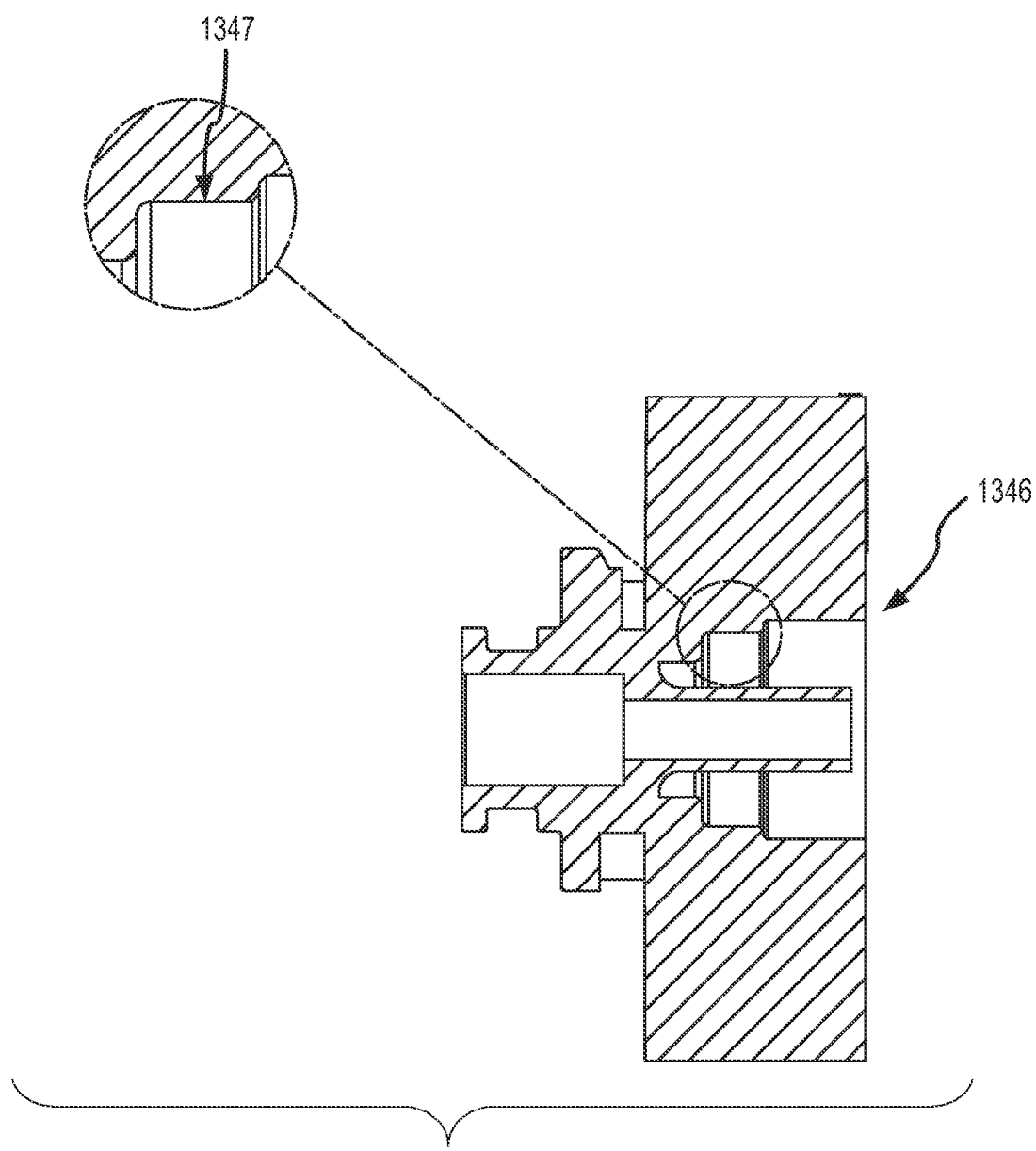
FIG. 13 is a sectional view of endcap 1302 in an example embodiment of the invention.
Figure 14:
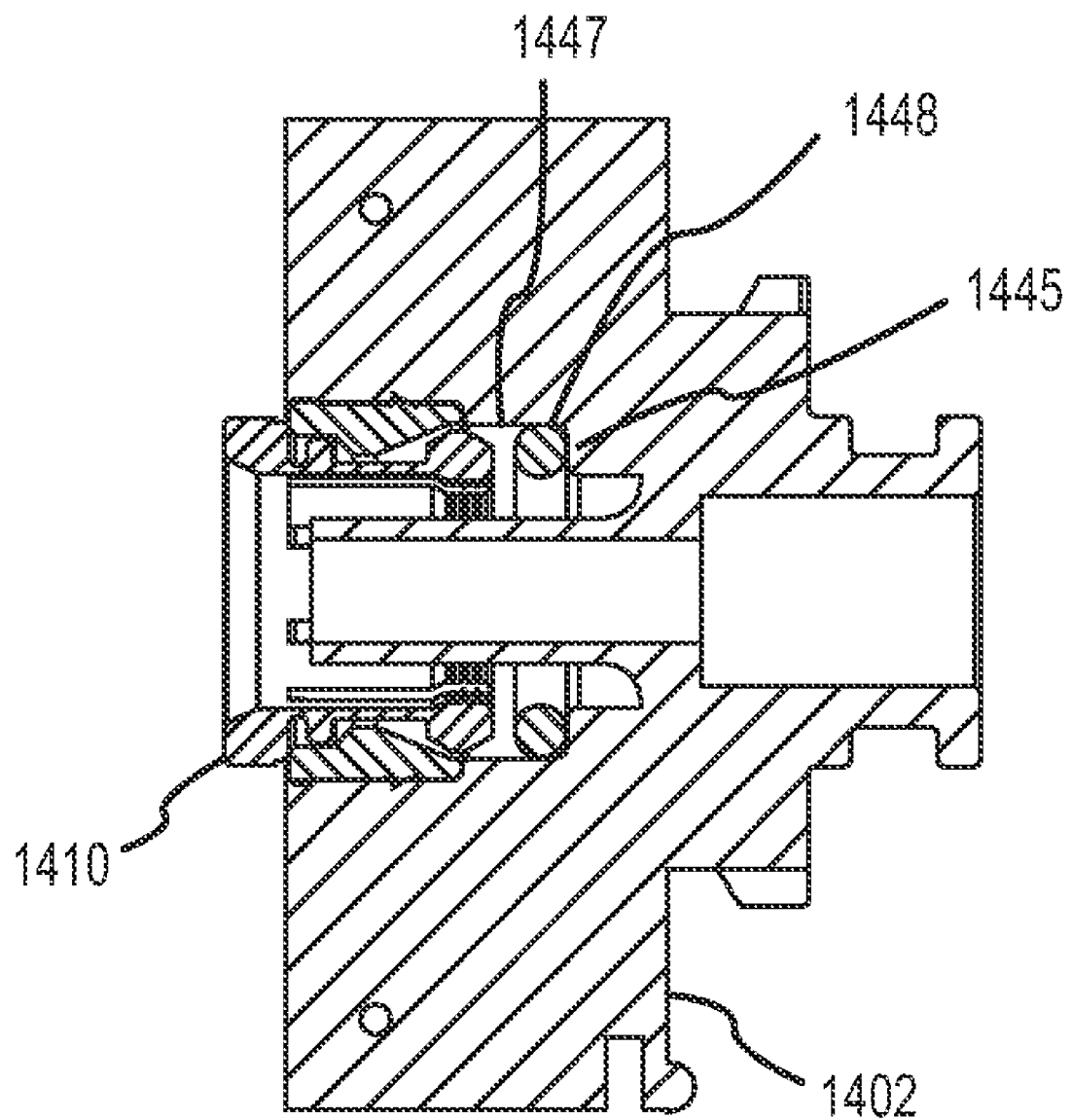
FIG. 14 is a sectional view of endcap 1402 with an inlet fixture installed in an example embodiment of the invention.

FIG. 13 is a sectional view of endcap 1302 in an example embodiment of the invention. Mounting feature 1346 is formed into the side of endcap 1302. Mounting feature 1346 is configured to allow inlet fixture (not shown) to be press fit into mounting feature 1346. FIG. 14 is a sectional view of endcap 1402 with inlet fixture 1410 installed into the mounting feature. Inlet fixture 1410 contains O-ring 1448. O-ring 1448 forms a seal against cylindrical bore 1447, the face 1445 of cylindrical bore 1447, and an air supply tube (not shown) when the air supply tube is inserted into inlet fixture 1410.

Figure 15:
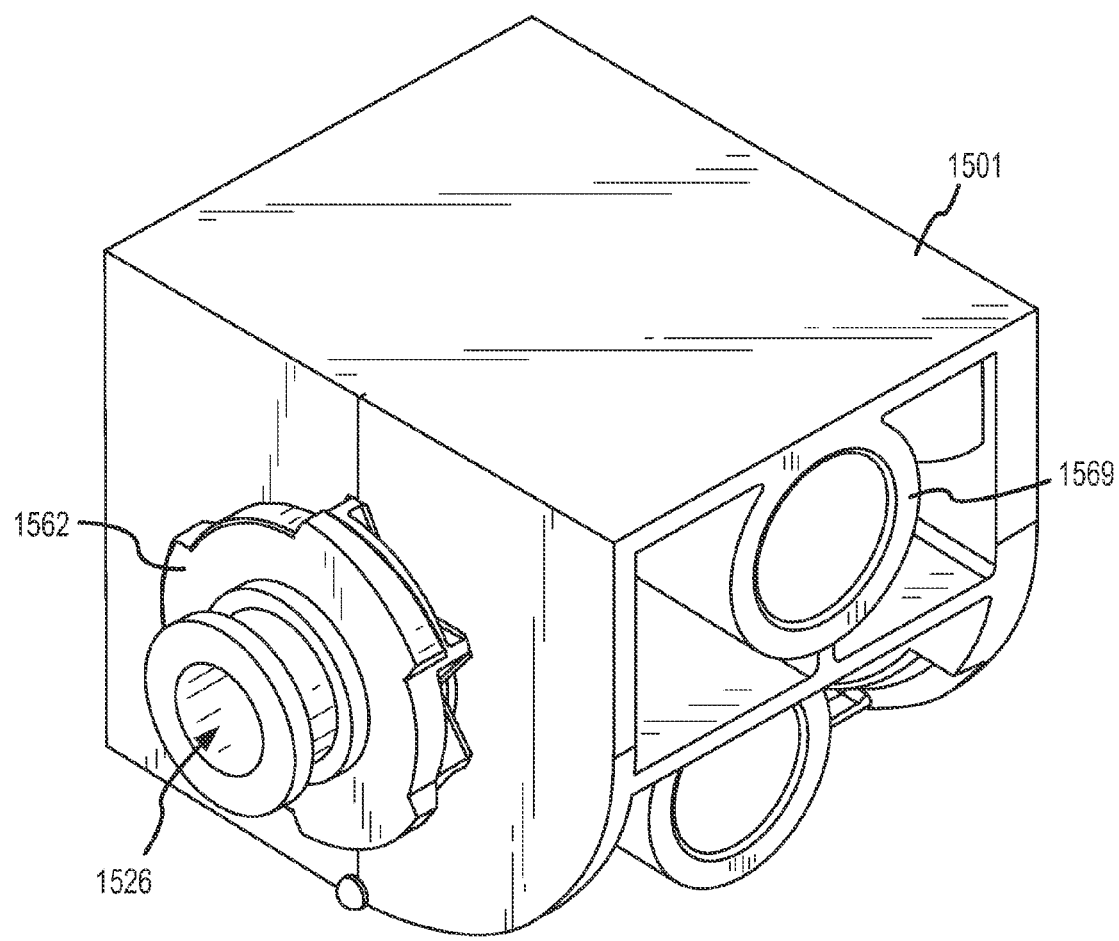
FIG. 15 is an isometric view of a supply coupler in an example embodiment of the invention.

FIG. 15 is an isometric view of a supply coupler in an example embodiment of the invention. Supply coupler has the male part 1562 of the connector on one face and the female part of the connector (not shown) on the opposite face of the supply coupler. Passageway 1526 runs between the male connector and the female connector. Inlet port 1569 is coupled to or intersects with passageway 1526 allowing an additional supply line to be coupled to tie passageway 1526 through inlet port 1569. In operation, an air distribution system may have a supply coupler removably coupled into the air distribution system as every Nth device. In another example embodiment (not shown) inlet port may be moved from the front face of supply coupler (as shown in FIG. 15) to surface 1501.

Figure 16:
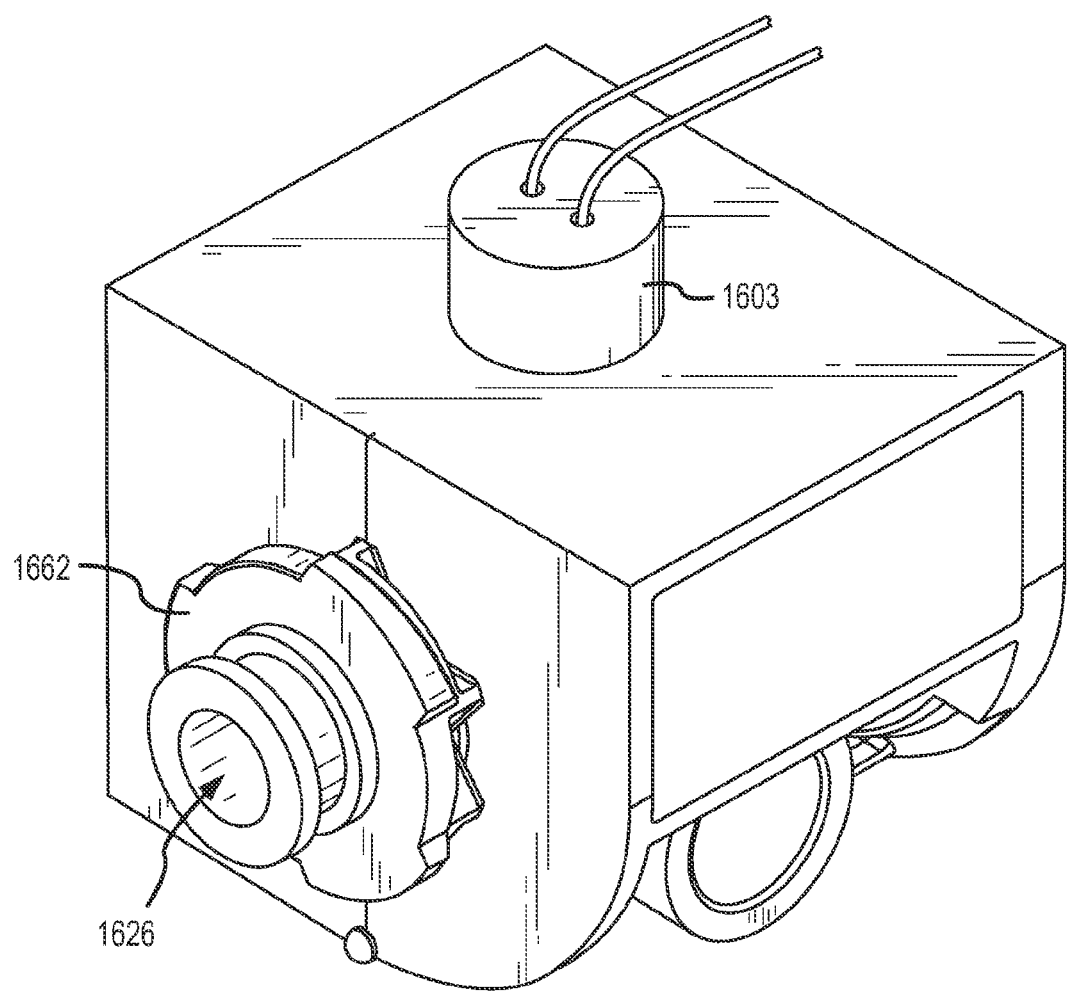
FIG. 16 is an isometric view of a pressure gage assembly in an example embodiment of the invention.

FIG. 16 is an isometric view of a pressure gage assembly in an example embodiment of the invention. Pressure gage assembly has the male part 1662 of the connector on one face and the female part of the connector (not shown) on the opposite face of the pressure gage assembly. Passageway 1626 runs between the male connector and the female connector. Pressure gage 1603 is coupled to passageway 1526 allowing the pressure inside passageway 1626 to be monitored. In operation, pressure gage assembly may be removably coupled into the air distribution system.

In the embodiments describe above, examples of the invention use an electromechanical switch as one of the part being chained together. Other devices may also take advantage of the invention and be removably chained together. One type of device is a pressure relief also called a safety valve. A pressure relief may be created with male and female connectors on opposite faces and inserted into a chain of other devices. Some examples of other types of devices that may be included in the chain of devices removably coupled together are: pressure switches, a pressure gage, a bleed valve, additional inlet sources, or any other pneumatic or hydraulic device.

The invention is described above using example embodiments for a pneumatic or air distribution system. However the invention is not limited to pneumatic systems, and includes hydraulic systems as well.

We claim:

1. An apparatus, comprising:
   a coupling device having a first side and a second side opposite the first side, where a male part of a connector is on the first side and a female part of the connector is on the second side;
   the coupling device having a passageway connecting the male part of the connector on the first side to the female part of the connector on the second side;
   the coupling device having an output port where the coupling device is configured to switchably connect the output port to the passageway;
   where the male part of the connector has at least two protrusions extending from a cylindrical barrel;
   where the at least two protrusions extending from the cylindrical barrel are not symmetrically spaced around the cylindrical barrel.

2. An apparatus, comprising:
   a coupling device having a first side and a second side opposite the first side, where a male part of a connector is on the first side and a female part of the connector is on the second side,
   the coupling device having a passageway connecting the male part of the connector on the first side to the female part of the connector on the second side;
   the coupling device having an output port where the coupling device is configured to switchably connect the output port to the passageway;
   where the male part of the connector has at least two protrusions extending from a cylindrical barrel;
   where at least one of the at least two protrusions extending from the cylindrical barrel is a different size than the other protrusions.

3. An apparatus, comprising:
   an coupling device having a first side and a second side opposite the first side, where a male part of a connector is on the first side and a female part of the connector is on the second side,
   the coupling device having a passageway connecting the male part of the connector on the first side to the female part of the connector on the second side;
   the coupling device having an output port where the coupling device is configured to switchably connect the output port to the passageway;
   a mounting hole going through the coupling device where the mounting hole is generally perpendicular to, but not intersecting with, the passageway;
   where the coupling device has a back side generally perpendicular to the first and second sides and where the mounting hole is generally perpendicular to and goes through the back side, the back side having a support surface configured to support the coupling device when a bolt in the mounting hole forces the back side against a surface and where the support surface is defined by a plane;
   a plurality of cavities in the back side where the cavities are generally recessed from the support surface;
   a front side generally opposite the back side;
   a plurality of drain holes connecting the back side to the front side where at least one drain hole exits into each of the plurality of cavities.

4. An apparatus, comprising:
   a coupling device having a first side and a second side opposite the first side, where a male part of a connector is on the first side and a female part of the connector is on the second side,
   the coupling device having a passageway connecting the male part of the connector on the first side to the female part of the connector on the second side;
   the coupling device having an output port where the coupling device is configured to switchably connect the output port to the passageway;
   where the coupling device switchably connects the output port to the first passageway;
   an exhaust port in a bottom of the coupling device and configured to vent liquid exhaust and gas exhaust;
   an exhaust cap attached to the coupling device and configured to cover the exhaust port with a first surface;
   the exhaust cap having a first edge and a second edge and configured to create a controlled gap using spacing ribs between the solenoid switch and the first and second edges to allow the gas exhaust to escape through the controlled gaps.

5. The apparatus as in one of claims 1-4, wherein the coupling device comprises a pressure relief valve.

6. The apparatus as in one of claims 1-4, wherein the coupling device comprises a pressure switch.

7. The apparatus as in one of claims 1-4, wherein the coupling device comprises a pressure gage.

8. The apparatus as in one of claims 1-4, wherein the coupling device comprises a bleed valve.

9. The apparatus as in one of claims 1-4, wherein the coupling device comprises an additional inlet source.

10. The apparatus of claim 4, further comprising:
    at least one ridge rising from the first surface of the exhaust cap where the ridge encloses an area;
    the at least one ridge having an opening such that the at least one ridge is not contiguous;
    the ridge is positioned on the first surface of the exhaust cap such that the area is underneath the exhaust port,
    a drain hole in the first surface of the exhaust cap where the drain hole is not in the area enclosed by the at least one ridge.

11. The apparatus of claim 10 whew the drain hole is positioned adjacent to the opening in the ridge.

12. The apparatus of claim 10 where the exhaust cap is fastened to the coupling device by snapping at least one opening in the exhaust cap over a corresponding catch on the coupling device.

* * * * *